Dec. 31, 1968

R. L. MESSENGER 3,419,104

OPERATOR SIDE GUARD FOR USE WITH AN INDUSTRIAL TRUCK

Filed Dec. 5, 1966

INVENTOR
RONALD L. MESSENGER
BY
ATTORNEY

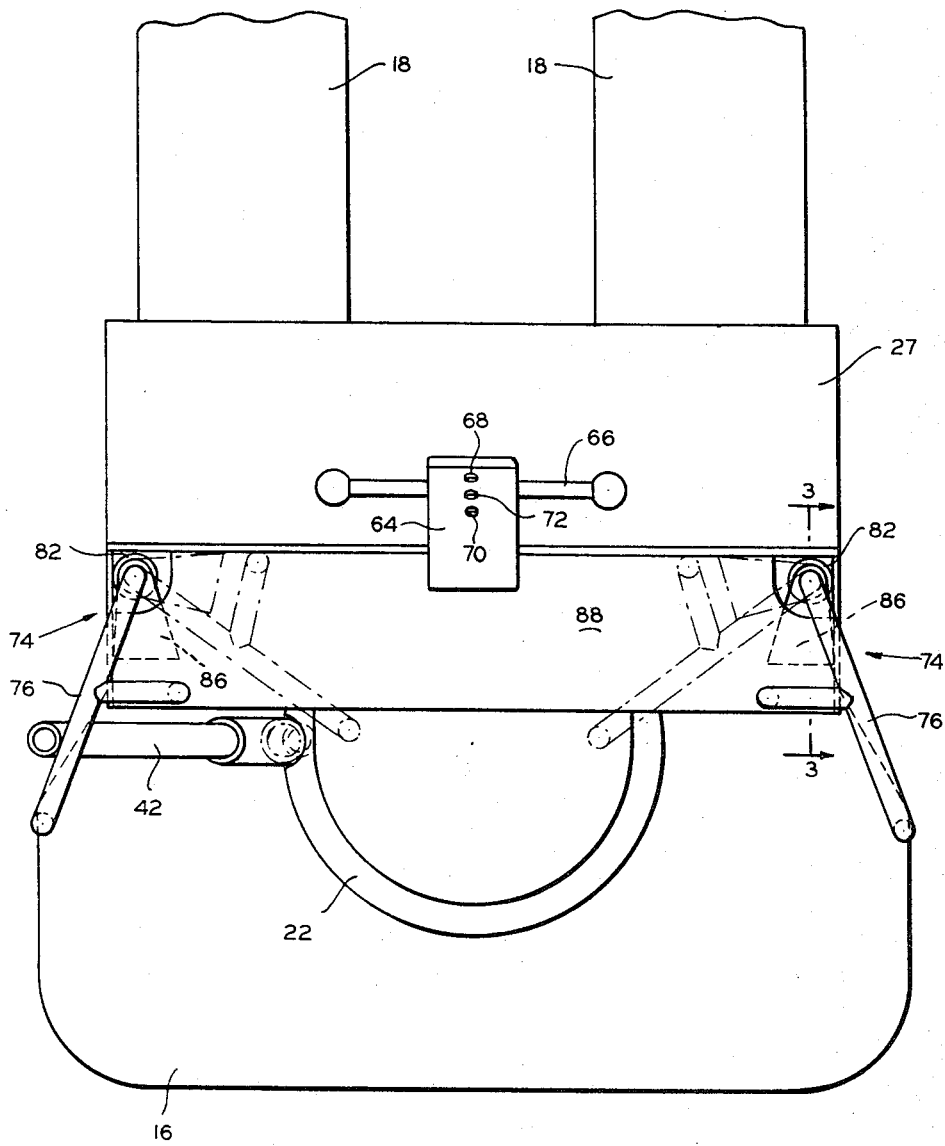

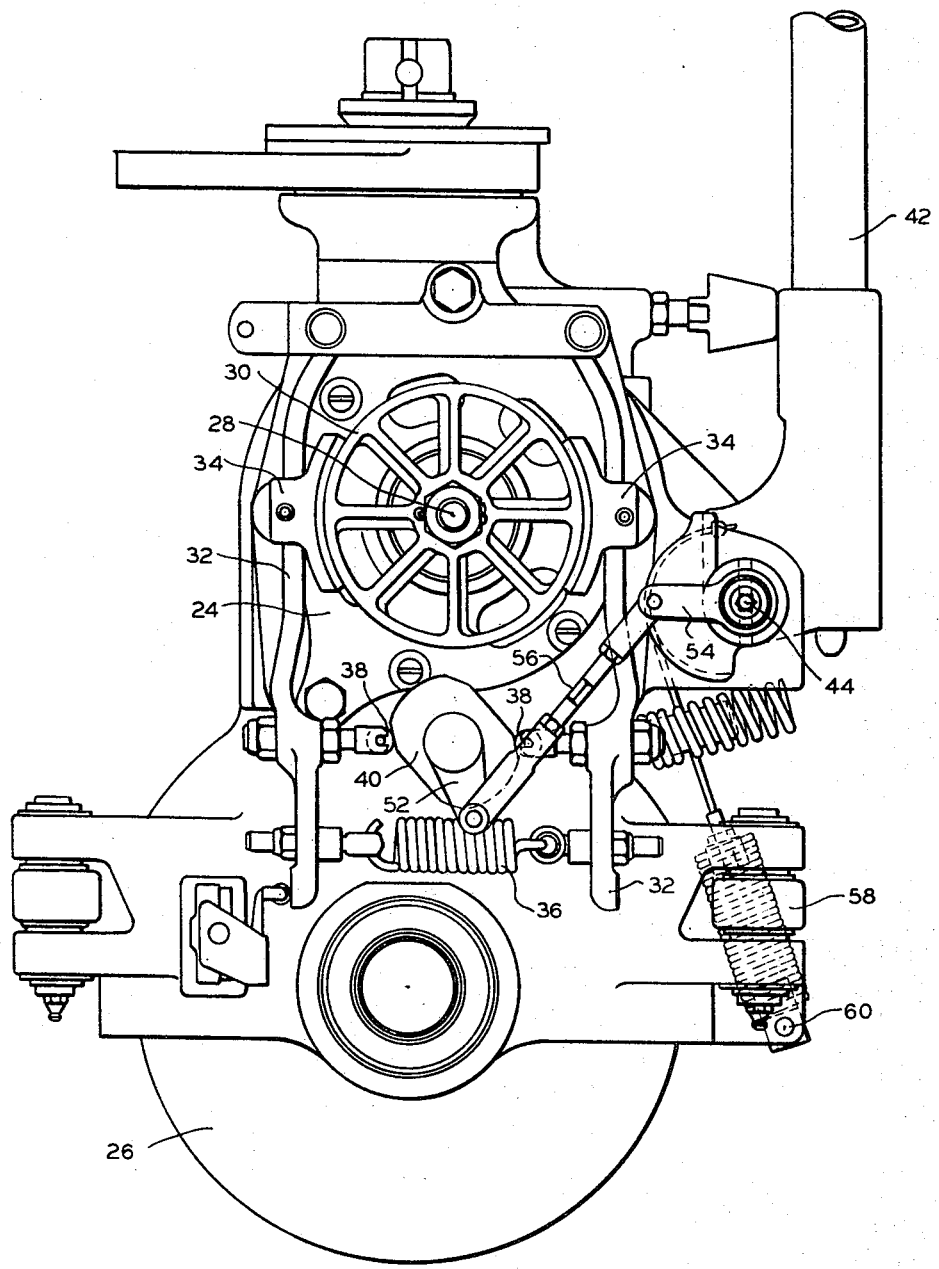

United States Patent Office 3,419,104
Patented Dec. 31, 1968

3,419,104
OPERATOR SIDE GUARD FOR USE WITH AN INDUSTRIAL TRUCK
Ronald L. Messenger, Battle Creek, Mich., assignor to Clark Equipment Company, a corporation of Michigan
Filed Dec. 5, 1966, Ser. No. 599,183
8 Claims. (Cl. 180—82)

ABSTRACT OF THE DISCLOSURE

An operator side guard for use with an industrial truck alongside which the operator may walk or on which the operator may ride. The truck includes a handle which may be swung from side to side to steer the truck and moved to a vertical position to apply the truck brake. The guard is connected to the truck for pivotal movement about a vertical axis so that when the handle is moved to the vertical position from a substantially horizontal position at one side of the truck the guard will pivot out of the path of the handle when engaged by it.

---

It is an object of my invention to make pedestrian-rider type industrial trucks safer and more comfortable for the operator.

In carrying out my invention in a preferred embodiment I provide at least one side guard which is mounted on the type of industrial truck contemplated for pivotal movement about a vertical axis. There also is provided a stop which limits outward movement of the guard to no further than a given position.

Figure 1:
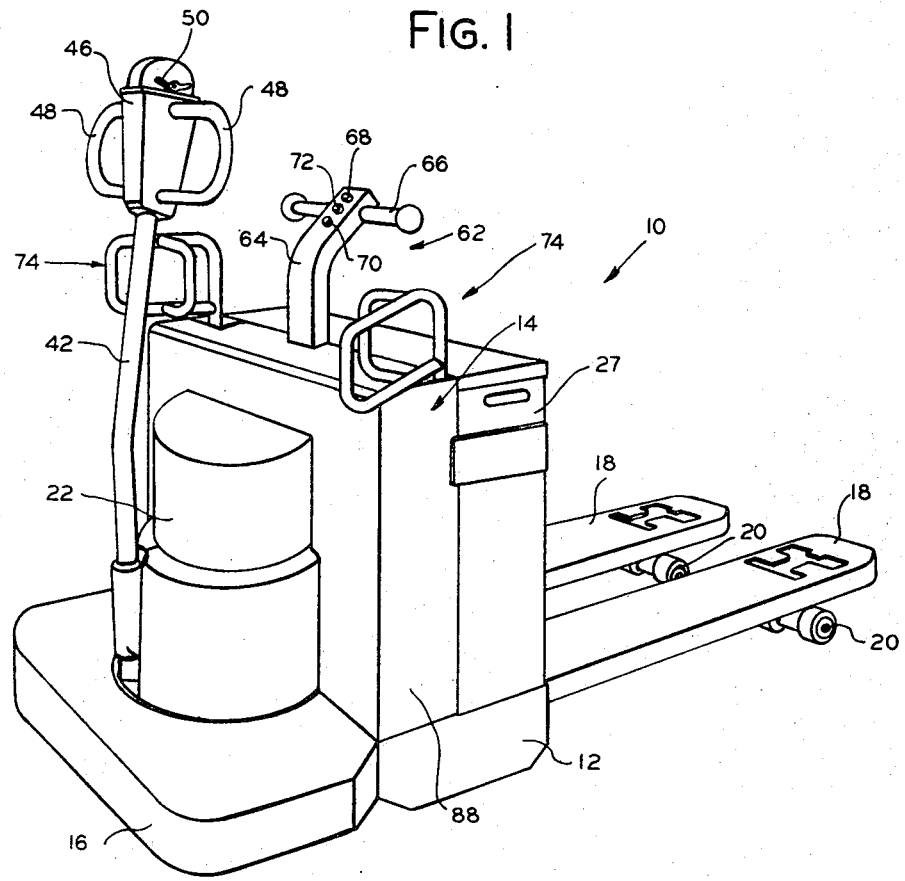
Figure 3:
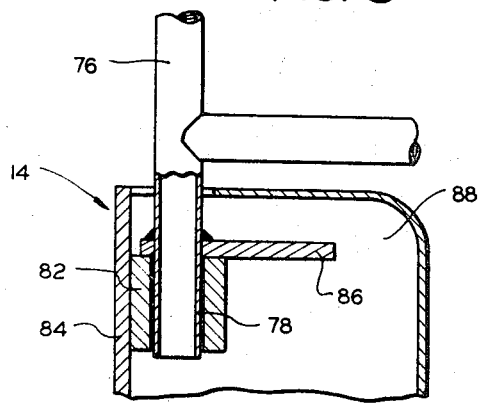

The above and other objects, features and advantages of my invention will be more readily understood when the following detailed description is taken in conjunction with the accompanying drawing wherein:

FIGURE 1 is a front quarter perspective view of a pedestrian-rider type industrial truck embodying my invention, FIGURE 2 is a fragmentary plan view of the truck shown in FIG. 1, FIGURE 3 is a fragmentary cross-section taken along the line 3—3 in FIG. 2, and FIGURE 4 is a view of the drive assembly for the truck of FIG. 1.

Referring now to the drawing, the reference numeral 10 denotes generally a pedestrian-rider type industrial truck having a frame 12 with an upwardly extending portion 14, a forwardly extending operator's platform 16 and a pair of rearwardly extending fork arms 18 which are adapted to be supported at one end thereof by trail wheels 20. Fork arms 18 may be inserted beneath a pallet in a lowered position and then elevated to raise the pallet off of the supporting surface so that the pallet may be transported by truck 10, as is conventional in such trucks. Connected to frame 12 generally forwardly of frame portion 14 is a drive assembly 22 (FIG. 4) which is mounted for pivotal movement about a substantially vertical axis. Drive assembly 22 includes an electric motor 24 which is operatively connected to a dirigible wheel 26 (FIG. 4). Electric motor 24 is powered by a battery, not shown, which is located in a battery compartment 27 that is located rearwardly of upstanding portion 14. Motor 24 includes a shaft 28 to which a brake drum 30 is fixed. Pivotally anchored to assembly 22 on each side of drum 30 is a pair of brake shoe arms 32 to which a pair of brake shoes 34 are connected, respectively. Connected between the lower ends of arms 32 is a tension spring 36 which serves to bias the shoes into engagement with brake drum 30. Also connected to arms 32 are a pair of rollers 38 which engage a rotatable cam 40. Rollers 38 and cam 40 function so that when cam 40 is rotated in one direction the arms 32 are forced apart, thereby releasing the brake.

Drive assembly 22 also includes a steering control handle 42 which is connected at point 44 for pivotal movement about a substantially horizontal axis. Connected to the end of handle 42 opposite pivot point 44 is a control head 46 which includes a pair of U-shaped hand grips 48 and a motor speed and direction control lever 50. By manipulating lever 50 the operator can energize motor 24 to drive the truck 10 forwardly or rearwardly in either first or second speeds of operation. Further, by swinging handle 42 from side to side the operator can steer truck 10 through dirigible wheel 26. Handle 42 is connected to cam 40 by means of a pair of lever arms 52 and 54 which are connected by a rigid link 56, whereby downward movement of control handle 42 causes cam 40 to rotate in a counterclockwise direction, as viewed in FIG. 4, to force arms 32 apart and thus release the brake. On the other hand, upward movement of control handle 42 to the substantially vertical position shown in FIGS. 1 and 4 results in cam 40 moving in a clockwise direction, and thus allows arms 32 to be pulled together by spring 36 with the result that the brake is applied. Control handle 42 is normally biased to the brake applied vertical position by means of a tension spring 58 which is connected between control handle 42 and an anchor point 60. With this arrangement control handle 42 is pivotal through a vertical arc between a substantially horizontal position and a substantial vertical position, and due to the bias of spring 58 will return to the vertical position when released by the operator from any other position.

Connected to frame portion 14 and extending upwardly therefrom is a stationary support and control handle 62 which includes a post 64 and a pair of hand grips 66. Located on post 64 is a push-button 68 which actuates mechanism to raise fork arms 18, a push button 70 which actuates mechanism to lower fork arms 18 and a push button 72 which conditions electric motor 24 for high speed drive.

Connected to frame portion 14 is a pair of operator side guards or supports 74. Each side guard 74 is located adjacent one side of frame portion 14 and is mounted for pivotal movement about a vertical axis. Further, each guard 74 includes a generally rectangular portion 76 with a downwardly extending tubular projection 78 and a generally U-shaped portion 80 connected to rectangular portion 76, preferably by welding. Rectangular portion 76 and U-shaped portion 80 define a wide V within which an operator may conveniently cradle a hip when he is standing upon platform 16 and guard 74 extending substantially forwardly, as shown in FIGS. 1 and 2. Projection 78 of each guard 74 is journaled in a tube 82 which preferably is welded to a wall 84 of frame portion 14. A plate 86 is preferably welded to projection 78 and supports guard 74 on the upper end of tube 82. Plate 86 also serves to limit the pivotal movement of guard 76 from a generally inwardly extending position which is shown in dotted outline in FIG. 2 to a generally forwardly extending position shown in solid lines in FIGS. 1 and 2. When guard 74 is pivoted to the extreme inwardly extending position plate 86 abuts wall 84 of frame portion 14 and when guard 74 is in the extreme forwardly extending position plate 86 abuts a side wall 88 of frame portion 14.

In operating truck 10 an operator can stand upon platform 16, cradling a hip in one of guards 74, while providing additional steadying support for himself by holding onto one of grips 66 with one hand and holding one of grips 48 of handle 42 with the other hand. Thus, the operator may manipulate buttons 68, 70 and 72 with the same hand that is holding onto one of grips 66 while manipulating lever 50 with the hand which is holding grip 46 and at the same time swing handle 42 from side to side in order to steer truck 10.

In the event that the operator is using truck 10 as a pedestrian type truck he walks alongside the truck and controls it by holding onto one or both of grips 48 and swings handle 42 from side to side to steer the truck and manipulates lever 50 to control the speed and direction of drive of the truck. When the operator is utilizing truck 10 as a pedestrian type truck, he can swing handle 42 from side to side to the extreme position shown in FIG. 2, in which case handle 42 is located beneath rectangular portion 76 of one of guards 74. In order to apply the truck brake when handle 42 is in this position, or any other position, all that is necessary is to permit handle 42 to return to the substantially vertical position shown in FIG. 1. However, with the disposition of handle 42 and guard 74 as shown in FIG. 2, guard 74 is in the path of the upward movement of handle 42 to its vertical position. Guard 74, however, does not interfere with the upward movement of handle 42 because when handle 42 contacts guard 74 it causes guard 74 to pivot inwardly out of the path of handle 42, eliminating what would otherwise be a serious safety hazard since it would not be possible to apply the truck brake when the handle 42 is in either of its extreme side positions and guards 74 were not movable out of the path of handle 42.

The above-detailed description is intended to be illustrative only, and while only a single preferred embodiment of my invention has been shown, it will be understood that various changes may be made to my invention without departing from the spirit and scope of it. Therefore, the limits of my invention should be determined from the following appended claims.

I claim:

1. In a vehicle, the combination comprising a frame, an operator support connected to the said frame for pivotal movement about a substantially vertical axis, means for limiting outward pivotal movement of the said support, and a drive assembly connected to the said frame for pivotal movement about a substantially vertical axis, the said assembly including a dirigible wheel and a steering handle operatively connected to the said dirigible wheel and pivotal about a horizontal axis between substantially horizontal and vertical positions so that when the said handle engages the said support during movement of the said handle toward the said vertical position the said support will pivot inwardly to a position out of the path of the said handle.

2. The combination as set forth in claim 1 wherein the said support is located adjacent one side of the said frame and including a second operator support connected to the said frame adjacent the other side thereof for pivotal movement about a substantially vertical axis, and means for limiting outward pivotal movement of the said second support.

3. The combination as set forth in claim 2 wherein the said limiting means prevent the said supports from pivoting outwardly past generally forwardly extending positions.

4. The combination as set forth in claim 2 and including a stationary support and control handle connected to the said frame intermediate the said supports.

5. The combination as set forth in claim 1 and including a stationary support and control handle connected to the said frame.

6. The combination as set forth in claim 1 and including a brake connected to the said dirigible wheel, means for applying the said brake, the said applying means being operatively connected to said handle so that the said brake is applied when the said handle is in the said vertical position, and means for resiliently biasing the said handle to the said vertical position.

7. In a vehicle, the combination comprising a frame, the said frame including an upwardly extending portion and an operator's platform extending forwardly from the said portion, a drive assembly connected to the said frame for pivotal movement about a substantially vertical axis, the said assembly including a dirigible wheel and a steering handle operatively connected to the said dirigible wheel and pivotal about a horizontal axis between substantially horizontal and vertical positions, a pair of operator supports connected to the said portion in spaced apart relation, each support being connected for pivotal movement about a substantially vertical axis, means for limiting outward pivotal movement of the said supports, and a stationary support and control handle connected to the said portion intermediate the said supports.

8. The combination as set forth in claim 7 and including a brake connected to the said dirigible wheel, means for applying the said brake, the said applying means being operatively connected to the said handle so that the said brake is applied when the said handle is in the said vertical position, and means for resiliently biasing the said handle to the said vertical position.

References Cited

UNITED STATES PATENTS

| | | | |
|---|---|---|---|
| 895,069 | 8/1908 | Buckwalter | 280—150 |
| 2,242,138 | 5/1941 | Muma | 297—349 X |
| 2,592,045 | 4/1952 | Le Moir | 280—150 |
| 2,899,093 | 8/1959 | Morrell | 180—26 X |
| 2,950,773 | 8/1960 | Ulinski | 180—26 |
| 3,016,973 | 1/1962 | Williamson | 180—13 X |
| 3,056,461 | 10/1962 | Quayle | 180—52 |
| 3,165,357 | 1/1965 | Ruedemann | 297—390 X |
| 3,213,957 | 10/1965 | Wrigley | 180—65 X |
| 3,236,394 | 2/1966 | McMullen | 297—349 X |

KENNETH H. BETTS, *Primary Examiner.*

U.S. Cl. X.R.

180—19; 280—150